United States Patent
Standke et al.

(10) Patent No.: US 10,626,130 B2
(45) Date of Patent: Apr. 21, 2020

(54) PROCESS FOR PREPARING A COLOURLESS SOLUTION OF 3-(N-BENZYL-2-AMINOETHYL) AMINOPROPYLTRIMETHOXY-SILANE HYDROCHLORIDE IN METHANOL

(71) Applicant: Evonik Operations GmbH, Essen (DE)

(72) Inventors: Burkhard Standke, Loerrach (DE); Christian Waßmer, Hausen (DE); Kerstin Bibbo, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 64 days.

(21) Appl. No.: 16/161,859

(22) Filed: Oct. 16, 2018

(65) Prior Publication Data

US 2019/0112323 A1 Apr. 18, 2019

(30) Foreign Application Priority Data

Oct. 18, 2017 (EP) ................................. 17197077
Jan. 3, 2018 (EP) .................................. 18150224

(51) Int. Cl.
| | | |
|---|---|---|
| C07F 7/18 | (2006.01) | |
| C07F 7/20 | (2006.01) | |
| C08J 5/10 | (2006.01) | |
| C09J 7/38 | (2018.01) | |
| C08J 5/12 | (2006.01) | |
| C08K 5/5419 | (2006.01) | |
| C08K 3/013 | (2018.01) | |

(52) U.S. Cl.
CPC .......... *C07F 7/1892* (2013.01); *C07F 7/1804* (2013.01); *C07F 7/20* (2013.01); *C08J 5/10* (2013.01); *C08J 5/12* (2013.01); *C09J 7/38* (2018.01); *C08J 2300/00* (2013.01); *C08K 3/013* (2018.01); *C08K 5/5419* (2013.01)

(58) Field of Classification Search
None
See application file for complete search history.

(56) References Cited

U.S. PATENT DOCUMENTS

| | | | |
|---|---|---|---|
| 4,244,844 A | 1/1981 | Molinier et al. | |
| 4,246,145 A | 1/1981 | Molinier et al. | |
| 4,330,444 A | 5/1982 | Pollman | |
| 4,382,991 A | 5/1983 | Pollman | |
| 4,499,152 A | 2/1985 | Green et al. | |
| 4,849,294 A | 7/1989 | Plueddemann | |
| 4,902,556 A | 2/1990 | Benedikt et al. | |
| 4,914,220 A * | 4/1990 | Desmond | C07C 45/516 556/436 |
| 5,591,818 A | 1/1997 | Standke et al. | |
| 7,834,073 B2 | 11/2010 | Standke et al. | |
| 2008/0003448 A1 | 1/2008 | Standke et al. | |

FOREIGN PATENT DOCUMENTS

| | | | |
|---|---|---|---|
| DE | 28 02 242 | 7/1978 | |
| EP | 0 176 062 | 4/1986 | |
| EP | 0 338 128 | 10/1989 | |
| EP | 0 353 766 | 2/1990 | |
| EP | 0 590 270 | 4/1994 | |
| JP | 01-259369 | 10/1989 | |
| WO | 2005/118599 | 12/2005 | |
| WO | WO-2005118599 A1 * | 12/2005 | ............. C08J 3/095 |

OTHER PUBLICATIONS

APHA/ISO 6271—Technical Details (http://www.chemtronic-gmbh.de/index.php/sitemap/79-ctr-english/95-colour-standards—... (Year: 1981).*
5,591,818, filed Jan. 7, 1997, Standke et al.
7,834,073, filed Nov. 16, 2010, 2008/0003448, Standke et al.

* cited by examiner

*Primary Examiner* — Clinton A Brooks
*Assistant Examiner* — Kofi Adzamli
(74) *Attorney, Agent, or Firm* — Grüneberg and Myers PLLC

(57) ABSTRACT

A process can prepare a colourless, methanolic solution of 3-(N-benzyl-2-aminoethyl)aminopropyltrimethoxysilane hydrochloride. The process includes, in step 1 fractionally distilling the vinylbenzyl chloride reactant component with addition of at least one stabilizer, and in step 2, metering and mixing the distillate (vinylbenzyl chloride) from step 1 into an initial charge of N-(2-aminoethyl)-3-aminopropyltrimethoxysilane and methanol in a molar ratio of the N-(2-aminoethyl)-3-aminopropyltrimethoxysilane to vinylbenzyl chloride of 1.0:0.80 to 1.0:1.15 and at a temperature in the range from 40 to 60° C. and leaving them to react further. The colourless, methanolic solution has an APHA colour number of <200 mg Pt—Co/l.

13 Claims, No Drawings

PROCESS FOR PREPARING A COLOURLESS SOLUTION OF 3-(N-BENZYL-2-AMINOETHYL) AMINOPROPYLTRIMETHOXY-SILANE HYDROCHLORIDE IN METHANOL

CROSS-REFERENCE TO RELATED APPLICATION

The present application claims priority to EP 17197077.5, filed on Oct. 18, 2017, and to EP 18150224.6, filed on Jan. 3, 2018, each incorporated herein by reference.

BACKGROUND OF THE INVENTION

Field of the Invention

The present invention provides a process for preparing a colourless solution (also referred to hereinafter as composition) of 3-(N-benzyl-2-aminoethyl)aminopropyltrimethoxysilane hydrochloride in methanol and to the use thereof.

Discussion of the Background

The preparation of hydrochloride-functionalized aminosilanes, for example of 3-(N-vinylbenzyl-2-aminoethyl)aminopropyltrimethoxysilane or 3-(N-benzyl-2-aminoethyl)aminopropyltrimethoxysilane, and the use thereof as adhesion promoters, for example, has long been known (U.S. Pat. No. 4,902,556, EP 353 766, U.S. Pat. No. 4,849,294, EP 338 128, U.S. Pat. Nos. 4,499,152, 4,382,991, 4,330,444, DE 28 02 242, JP 01-259369, EP 176 062, EP 590 270, WO 2005/118599).

However, colourless products are increasingly being required for many applications. Regrettably, the reaction of vinylbenzyl chloride (VBC) with N-(2-aminoethyl)-3-aminopropyltrimethoxysilane (DAMO) for preparation of a 3-(N-vinylbenzyl-2-aminoethyl)aminopropyltrimethoxysilane hydrochloride in industrial practice frequently affords an intensely orange/yellowish product. Precipitates that are troublesome in the preparation are also observed, and have to be separated from the product at additional cost and inconvenience.

The problem was therefore that of providing a process in which the preparation of a colourless solution or composition of 3-(N-benzyl-2-aminoethyl)aminopropyltrimethoxysilane hydrochloride in methanol can be assured. Another concern was to avoid precipitates in the preparation if possible. Such a colourless solution is to be understood to mean a composition or solution that has a Gardner colour number<2 (ISO 4630, 2015, spectrometric measurement), especially a colour number of ≤200 mg Pt—Co/l according to APHA/ISO 6271 (Part 2, spectrometric measurement).

SUMMARY OF THE INVENTION

The problem is solved by the embodiments of the invention.

Thus, it has been found that, surprisingly, the reaction product obtained from N-(2-aminoethyl)-3-aminopropyltrimethoxysilane and vinylbenzyl chloride is a virtually colourless solution or composition of 3-(N-benzyl-2-aminoethyl)aminopropyltrimethoxysilane hydrochloride in methanol when the vinylbenzyl chloride used is first fractionally distilled with addition of at least one stabilizer, the subsequent reaction with N-(2-aminoethyl)-3-aminopropyltrimethoxysilane is conducted in methanol, and hence the product can advantageously be obtained directly. It has also been found that there is advantageously no occurrence of precipitates or product turbidity in the case of a reaction conducted in such a way. Optionally, a solution or composition thus obtained can be diluted in a defined manner with addition of methanol. Thus, advantageously, a composition or solution having a Gardner colour number of <2 and especially a colour number of ≤200 mg Pt—Co/l (as per APHA) is obtained.

One embodiment includes a process for preparing a colourless solution of 3-(N-benzyl-2-aminoethyl)aminopropyltrimethoxysilane hydrochloride in methanol, wherein the colourless solution has an APHA colour number of ≤200 mg Pt—Co/l, the process comprising:

fractionally distilling a vinylbenzyl chloride reactant component with addition of at least one stabilizer, to obtain a distillate containing vinylbenzyl chloride, and metering and mixing the distillate from said fractionally distilling into an initial charge of N-(2-aminoethyl)-3-aminopropyltrimethoxysilane and methanol in a molar ratio of the N-(2-aminoethyl)-3-aminopropyltrimethoxysilane to vinylbenzyl chloride of 1.0:0.80 to 1.0:1.15 and at a temperature in the range from 40 to 60° C. and leaving them to react further.

DETAILED DESCRIPTION OF THE INVENTION

The present invention provides a process for preparing a colourless solution of 3-(N-benzyl-2-aminoethyl)aminopropyltrimethoxysilane hydrochloride in methanol, where the solution has an APHA colour number of ≤200 mg Pt—Co/l,
  by
    in step 1 fractionally distilling the vinylbenzyl chloride reactant component with addition of at least one stabilizer and
    in step 2 metering and mixing the distillate (vinylbenzyl chloride) from step 1 into an initial charge of N-(2-aminoethyl)-3-aminopropyltrimethoxysilane and methanol in a molar ratio of the N-(2-aminoethyl)-3-aminopropyltrimethoxysilane to vinylbenzyl chloride of 1.0:0.80 to 1.0:1.15, preferably 1:0.99 to 1.01, and at a temperature in the range from 40 to 60° C. and leaving them to react further.

In addition, in step 1 of the process according to the invention, advantageously, at least one stabilizer from the group of nitromethane, 4-tert-butylpyrocatechol and/or 2,4-dinitrophenol is used.

In the process according to the invention, N-(2-aminoethyl)-3-aminopropyltrimethoxysilane and methanol are preferably included in the initial charge in step 2 in a weight ratio of 80:20 to 30:70, preferably of 70:30 to 40:60, especially of 60:40 to 50:50.

In addition, in the process according to the invention, preferably a vinylbenzyl chloride with APHA colour number≤5 mg Pt—Co/l is used in step 2, as advantageously obtained, for example, in step 1.

Suitably, in the process according to the invention, the product mixture present after the reaction in step 2 can be left to react further at a temperature in the range from 40 to 60° C. for a further period of 30 minutes to 3 hours while mixing.

Furthermore, the composition or solution obtained in step 2 can be diluted in a well-defined manner with addition of methanol.

For instance, in the process according to the invention, the composition or solution obtained in step 2 can advantageously be adjusted with addition of methanol to a content of 20% to 80% by weight, preferably 30% to 70% by weight, more preferably 35% to 60% by weight, especially of 40% to 50% by weight, of 3-(N-benzyl-2-aminoethyl)aminopropyltrimethoxysilane hydrochloride.

3-(N-vinylbenzyl-2-aminoethyl)aminopropyltrimethoxysilane hydrochloride can be illustrated, for example, by the following formula:

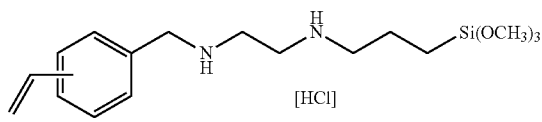

In general, the process according to the invention can be conducted as follows:

For the performance of step 1 of the present process, in order to obtain the VBC reactant component in suitable form, a distillation or rectification unit is used, which comprises, for example—but not exclusively—a heatable/coolable tank with stirrer apparatus and temperature monitoring/control, attached separating column, optionally having packing, reflux divider and reservoir vessel, rotary vane oil pump and pressure measurement/regulation unit including cold trap. Advantageously, in step 1, at least one stabilizer from the group of nitromethane, 4-tert-butylpyrocatechol and/or 2,4-dinitrophenol is added to the VBC. The first runnings and distillation residue from the fractional distillation are generally discarded.

In the present process, the reaction in step 2 is suitably—but not exclusively—executed in a heatable/coolable, i.e. temperature-regulated, stirred tank with reflux condenser and suitable metering unit for the reactive components. Thus, in step 2 according to the present process, in a suitable manner, N-(2-aminoethyl)-3-aminopropyltrimethoxysilane and methanol are initially charged and the distillate (vinylbenzyl chloride=VBC) from step 1 is metered with mixing into the mixture of N-(2-aminoethyl)-3-aminopropyltrimethoxysilane and methanol present in a molar ratio of the N-(2-aminoethyl)-3-aminopropyltrimethoxysilane to vinylbenzyl chloride, for example—but not exclusively—of 1.0:0.80 to 1.0:1.15, preferably 1:0.99 to 1.01, especially of 1:1, at a temperature in the range from 40 to 60° C., and left to react further for another period of time with mixing and temperature control. In the reaction in step 2 of the present process, there is advantageously no occurrence of any precipitates or turbidity, and so it is advantageously possible to dispense with additional workup measures. In this way, a clear, virtually colourless product having an APHA colour number of ≤200 mg Pt—Co/l is obtained directly, which can additionally be adjusted by addition of methanol, for example, to a content of 3-(N-benzyl-2-aminoethyl)aminopropyltrimethoxysilane hydrochloride of 20% to 80% by weight, based on the overall composition.

The present invention thus also provides a colourless composition comprising 3-(N-benzyl-2-aminoethyl)aminopropyltrimethoxysilane hydrochloride and methanol, where the composition or solution has a content of 3-(N-benzyl-2-aminoethyl)aminopropyltrimethoxysilane hydrochloride of 20% to 80% by weight, based on the overall composition, and an APHA colour number of ≤200 mg Pt—Co/l.

The composition according to the invention and products/compositions obtained in accordance with the invention are advantageously suitable as adhesion promoters between inorganic and organic surfaces, especially in the reinforcement of organic polymers with inorganic, preferably oxidic, fillers, glass fibres or metallic particles, and in the coating of inorganic surfaces, preferably of metals, metal oxides or glass, or organic polymers.

The present invention thus likewise provides for the use of a composition according to the invention or composition obtained or prepared in accordance with the invention as adhesion promoter between inorganic and organic surfaces, in the reinforcement of organic polymers with inorganic fillers, in the coating of inorganic surfaces organic polymers and in fibre-reinforced polymers as adhesion promoter between inorganic fibres and organic polymers.

The present invention is elucidated in detail by the examples which follow, without limiting the subject-matter.

Having generally described this invention, a further understanding can be obtained by reference to certain specific examples which are provided herein for purposes of illustration only, and are not intended to be limiting unless otherwise specified.

EXAMPLES

Analysis Methods:

Determination of hydrolysable chloride: 5 g of sample are dissolved with 20 ml of ethanol and 80 ml of acetic acid in a 150 ml beaker. The chloride content is determined by potentiographic titration with silver nitrate solution [c (AgNO$_3$)=0.01 mol/l]. A reagent blank is determined in the same way.

Calculation:

$$\text{Chloride [mg/kg]}=(A-B)\times 355/E$$

A=consumption for the sample in ml
B=consumption for the blank in ml
E=amount of sample in g The colour numbers were determined according to DIN EN ISO 6271 (Part 2, spectrometric measurement, APHA colour number, also called ISO 6271 for short hereinafter) and according to DIN EN ISO 4630 (2015, spectrometric measurement, Gardner colour number, also called ISO 4630 for short hereinafter).

Refractive indices were determined according to DIN 51423 and densities according to DIN 51757.

Comparative Example 1: [KB/1/21/1741; 3-(N-benzyl-2-aminoethyl)aminopropyltrimethoxysilane hydrochloride in Methanol from 4-chloromethylstyrene (Also Called Vinylbenzyl Chloride for Short Above and Hereinafter) from Yancheng Xingchen Chemical Co., Ltd]

Apparatus: 250 ml four-neck flask with precision glass stirrer, dropping funnel, jacketed coil condenser, liquid-phase thermometer, temperature-regulated oil bath.

36.99 g of Dynasylan® DAMO [N-(2-aminoethyl)-3-aminopropyltrimethoxysilane] and 24.58 g of methanol were initially charged while stirring. At a liquid-phase temperature of 50° C., 21.66 g of vinylbenzyl chloride—as available on the market (from YANCHENG XINGCHEN CHEMICAL Co.)—were added dropwise within 51 min. After addition of about 2 ml of vinylbenzyl chloride, the colour of the liquid phase turns an intense yellow. The maximum liquid-phase temperature during the addition of vinylbenzyl chloride was 55° C. After the addition of vinylbenzyl chloride had ended, the mixture was stirred at 50° C.-55° C. for another 2 h. Subsequently, the reaction mixture was diluted with 56.70 g of methanol. What was obtained was a product with a clear orange colour (139.93 g).

Analysis results for the product from Comparative Experiment 1:

| Determination | Result | Method |
| --- | --- | --- |
| Hydrolysable chloride [w/w %] | 3.7 | as described above |
| Gardner colour number | 9 | ISO 4630 |
| APHA colour number [mg Pt-Co/l] | *) | ISO 6271 |
| Refractive index | 1.3993 | DIN 51423 |
| Density (20° C.) [g/cm$^3$] | 0.910 | DIN 51757 |

[*] a value of 1 according to Gardner/ISO 4630 corresponds roughly to a value of 120 mg Pt-Co/l according to APHS/ISO 6271]

Example 1: [KB/V21/17-13 3-(N-benzyl-2-aminoethyl)aminopropyltrimethoxysilane hydrochloride in METHANOL Prepared with Vinylbenzyl Chloride Fraction 1 from VBC Distillation]

Firstly, the vinylbenzyl chloride (UBC) reactant component from YANCHENG XINGCHEN CHEMICAL Co., Ltd. was pretreated:

Apparatus: 500 ml four-neck flask with precision glass stirrer, column tube (l=25 cm, NS 29/32), a carbon Sulzer packing (l=50 mm, d=28 mm), liquid-phase and tops thermometer, reflux divider, rotary vane oil pump, manometer, cold trap, temperature-regulated oil bath.

410.288 g of vinylbenzyl chloride (yellow) were mixed with 0.361 g of nitromethane and initially charged in the 500 ml four-neck flask. Within 3.25 h, at a liquid-phase temperature of about 80° C. and an absolute pressure of about 0.1 mbar, 188.9 g of a clear colourless distillate were removed (fraction 1). This was additionally stabilized with 0.191 g of TBC (4-tert-butylpyrocatechol).

After distillation for a further two hours, 197.25 g of clear and colourless distillate were additionally removed. After distillation, 8.3 g of brown, slightly viscous distillation residue were isolated in the liquid phase.

TABLE 2

| Analysis results for vinylbenzyl chloride: | | |
| --- | --- | --- |
| | Gardner colour number ISO 4630 | APHA colour number [mg Pt-Co/l] ISO 6271 |
| Vinylbenzyl chloride untreated | 3 | *) |
| Vinylbenzyl chloride/fraction 1 | — | <5 |
| Vinylbenzyl chloride/fraction 2 | — | <5 |

[*] a value of 1 according to Gardner corresponds roughly to a value of 120 mg Pt-Co/l according to APHA/ISO 6271]

This was followed by the synthesis of a methanolic solution of 3-(N-benzyl-2-aminoethyl)-aminopropyltrimethoxysilane hydrochloride.

Apparatus: 250 ml four-neck flask with precision glass stirrer, dropping funnel, jacketed coil condenser, liquid-phase thermometer, temperature-regulated oil bath. 37.23 g of Dynasylan® DAMO (N-(2-aminoethyl)-3-aminopropyltrimethoxysilane) and 24.62 g of methanol were initially charged while stirring. At a liquid-phase temperature of 50° C., 21.72 g of vinylbenzyl chloride were added dropwise within 43 minutes. After addition of about 2 ml of vinylbenzyl chloride, the liquid phase is still clear and colourless. The maximum liquid-phase temperature during the addition of vinylbenzyl chloride was 58° C. After the addition of vinylbenzyl chloride had ended, the mixture was stirred at 50-55° C. for another 2 h. Subsequently, the reaction mixture was diluted with 56.58 g of methanol. What were obtained were 138.9 g of clear, virtually colourless product [3-(N-benzyl-2-aminoethyl)aminopropyltrimethoxysilane hydrochloride in methanol]; cf. Table 3.

TABLE 3

| Analysis results for 3-(N-benzyl-2-aminoethyl)aminopropyltrimethoxysilane hydrochloride in methanol from Example 1 | | |
| --- | --- | --- |
| Determination | Result | Method of determination |
| Hydrolysable chloride [w/w %] | 3.9 | as described above |
| APHA colour number [mg Pt-Co/l] | 175 | ISO 6271 |
| Refractive index | 1.4039 | DIN 51423 |
| Density (20° C.) [g/cm$^3$] | 0.909 | DIN 51757 |

[*] a value of 1 according to Gardner corresponds roughly to a value of 120 mg Pt-Co/l according to APHA/ISO 6271]

We claim:

1. A process for preparing a colourless solution of 3-(N-benzyl-2-aminoethyl)aminopropyltrimethoxysilane hydrochloride in methanol, wherein the colourless solution has an APHA colour number of ≤200 mg Pt—Co/l, the process comprising:
  fractionally distilling a vinylbenzyl chloride reactant component with addition of at least one stabilizer, to obtain a distillate containing vinylbenzyl chloride, and metering and mixing the distillate from said fractionally distilling into an initial charge of N-(2-aminoethyl)-3-aminopropyltrimethoxysilane and methanol in a molar ratio of the N-(2-aminoethyl)-3-aminopropyltrimethoxysilane to vinylbenzyl chloride of 1.0:0.80 to 1.0:1.15 and at a temperature in the range from 40 to 60° C. and leaving them to react further.

2. The process according to claim 1, wherein at least one stabilizer selected from the group consisting of nitromethane, 4-tert-butylpyrocatechol, and 2,4-dinitrophenol is used during said fractionally distilling.

3. The process according to claim 1, wherein a vinylbenzyl chloride with APHA colour number≤5 mg Pt—Co/l is used during said metering and mixing.

4. The process according to claim 1, wherein N-(2-aminoethyl)-3-aminopropyltrimethoxysilane is metered into vinylbenzyl chloride in said metering and mixing in a molar ratio of 1.0:0.99 to 1.0:1.01.

5. The process according to claim 1, wherein N-(2-aminoethyl)-3-aminopropyltrimethoxysilane and methanol are present in an initial charge in said metering and mixing in a molar ratio of 80:20 to 30:70.

6. The process according to claim 5, wherein N-(2-aminoethyl)-3-aminopropyltrimethoxysilane and methanol are present in the initial charge in a weight ratio of 70:30 to 40:60.

7. The process according to claim 5, wherein N-(2-aminoethyl)-3-aminopropyltrimethoxysilane and methanol are present in the initial charge in a weight ratio of 60:40 to 50:50.

8. The process according to claim 1, wherein a product mixture present after the reaction in said metering and mixing is left to react further at a temperature in the range from 40 to 60° C. for a further period of 30 minutes to 3 hours while mixing.

9. The process according to claim 1, wherein a composition obtained from said metering and mixing is diluted with addition of methanol.

10. The process according to claim 1, wherein a composition obtained in said metering and mixing is adjusted to a content of 20% to 80% by weight of 3-(N-benzyl-2-aminoethyl)aminopropyltrimethoxysilane hydrochloride with addition of methanol.

11. The process according to claim 10, wherein the composition obtained in said metering and mixing is adjusted to a content of 30% to 70% by weight of 3-(N-benzyl-2-aminoethyl)aminopropyltrimethoxysilane hydrochloride with addition of methanol.

12. The process according to claim 10, wherein the composition obtained in said metering and mixing is adjusted to a content of 35% to 60% by weight of 3-(N-benzyl-2-aminoethyl)aminopropyltrimethoxysilane hydrochloride with addition of methanol.

13. The process according to claim 10, wherein the composition obtained in said metering and mixing is adjusted to a content of 40% to 50% by weight of 3-(N-benzyl-2-aminoethyl)aminopropyltrimethoxysilane hydrochloride with addition of methanol.

\* \* \* \* \*